United States Patent
Wu et al.

(10) Patent No.: US 11,477,664 B2
(45) Date of Patent: Oct. 18, 2022

(54) DYNAMIC BEAM SWEEP PROCEDURE

(71) Applicant: QUALCOMM Incorporated, San Diego, CA (US)

(72) Inventors: Yongle Wu, San Diego, CA (US); Ting Kong, San Diego, CA (US); Arvind Vardarajan Santhanam, San Diego, CA (US); Yong Li, San Diego, CA (US); Jun Zhu, San Diego, CA (US); Raghu Narayan Challa, San Diego, CA (US); Viswanath Sankaran, San Diego, CA (US); Nagaraju Gajula, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 17/104,948

(22) Filed: Nov. 25, 2020

(65) Prior Publication Data

US 2021/0160706 A1    May 27, 2021

Related U.S. Application Data

(60) Provisional application No. 62/941,516, filed on Nov. 27, 2019.

(51) Int. Cl.
  *H04W 16/28* (2009.01)
  *H04W 36/00* (2009.01)
  (Continued)

(52) U.S. Cl.
  CPC .......... *H04W 16/28* (2013.01); *H04B 17/318* (2015.01); *H04B 17/336* (2015.01);
  (Continued)

(58) Field of Classification Search
  CPC . H04W 16/28; H04W 24/10; H04W 36/0072; H04W 36/08; H04W 52/52; H04B 17/318; H04B 17/336
  See application file for complete search history.

(56) References Cited

U.S. PATENT DOCUMENTS 11,159,995 B2 * 10/2021 Huang ................. H04B 7/0617
2014/0211891 A1 * 7/2014 Park .......................... H04B 1/16
  375/345

(Continued)

FOREIGN PATENT DOCUMENTS

EP    3917194 A1 * 12/2021 ............ H04W 16/18
EP    3944690 A1 *  1/2022
(Continued)

*Primary Examiner* — Deepa Belur
(74) *Attorney, Agent, or Firm* — Holland & Hart LLP

(57) ABSTRACT

Methods, systems, and devices for wireless communications are described. The method, systems, and devices may include techniques for establishing a first connection with a first cell operating in accordance with a first radio access technology (RAT), and performing a beam sweep procedure for one or more candidate beams for adding or handover to a second cell operating in accordance with millimeter wave (mmW) RAT. The beam sweep procedure may be performed based on previous beam measurements stored in a measurement database. The techniques may further include selecting a beam from the one or more candidate beams for adding or handover to the second cell based on the beam sweep procedure, and adding or handing over to the second cell by establishing a second connection with the second cell using the selected beam.

30 Claims, 9 Drawing Sheets

(51) Int. Cl.
  *H04W 36/08* (2009.01)
  *H04W 52/52* (2009.01)
  *H04B 17/318* (2015.01)
  *H04B 17/336* (2015.01)
  *H04W 24/10* (2009.01)

(52) U.S. Cl.
  CPC ....... *H04W 24/10* (2013.01); *H04W 36/0072* (2013.01); *H04W 36/08* (2013.01); *H04W 52/52* (2013.01)

(56) References Cited

U.S. PATENT DOCUMENTS

| | | | | |
|---|---|---|---|---|
| 2019/0045414 A1* | 2/2019 | Guerreiro | ............ | H04B 7/0619 |
| 2019/0281485 A1* | 9/2019 | da Silva | ................ | H04B 17/345 |
| 2020/0091608 A1* | 3/2020 | Alpman | ................ | H01Q 25/001 |
| 2020/0359404 A1* | 11/2020 | Nilsson | ............... | H04W 72/046 |

FOREIGN PATENT DOCUMENTS

| | | | | |
|---|---|---|---|---|
| WO | WO-2017196243 A1 * | 11/2017 | ........... | H04B 7/0486 |
| WO | WO-2019223634 A1 * | 11/2019 | ........... | H04B 7/0617 |

* cited by examiner

DYNAMIC BEAM SWEEP PROCEDURE

CLAIM OF PRIORITY

The present Application for Patent claims the benefit of U.S. Provisional Patent Application No. 62/941,516 by W U et al., entitled "DYNAMIC BEAM SWEEP PROCEDURE," filed Nov. 27, 2019, assigned to the assignee hereof, and expressly incorporated by reference herein.

INTRODUCTION

The following relates generally to wireless communications, and more specifically to performing a dynamic beam sweep procedure for establishing a wireless communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may establish a connection with a base station and communicate with the base station using beamformed transmissions. The UE may perform a beam sweep procedure to help detect and select a beam for establishing a connection with the base station. In some cases, conventional beam sweep procedures may include relatively long acquisition times and thus techniques to enable a UE to detect a beam with adequate channel conditions and to reduce an amount of time the UE takes to make such connections may be desirable.

SUMMARY

The described techniques relate to improved methods, systems, devices, and apparatuses that support a dynamic beam sweep procedure for adding or switch/handover to a cell or a base station that is configured to communicate in millimeter wave (mmW). For example, in an E-UTRA and New Radio Dual Connectivity (EN-DC) wireless network, a user equipment (UE) may first connect to a LTE type cell or base station and may then perform a beam sweep procedure to detect for an NR base station, e.g., Primary secondary cell group (SCG) cell (PSCell) that are configured to communicate in Frequency Range 2 (FR2), such as in millimeter wave (mmW). In FR2, the UE may use multiple receive beams to detect the NR cell. Generally, the UE may perform a beam sweep procedure (beam detections/measurements) over a set of wide beams, e.g., 8 pseudo-omni (PO) beams. The UE may select a suitable beam that may be used for adding or switching/handover to the NR PSCell.

The conventional beam sweep procedure may introduce a significant delay during the PSCell add or handover process. For example, a typical Synchronization Signal Block burst (SSBS) periodicity is 20 milliseconds (ms) and there is typically eight (8) wide beams in a beam sweep procedure. This results in a total of more than 160 ms for performing a complete beam sweep procedure. Such undesirable delay may have negative impact on user experience. As such, a dynamic beam sweep procedure is proposed that may reduce delay and improve efficiency in a PSCell add or handover process.

A method of wireless communications at a UE is described. The method may include establishing a first connection with a first cell operating in accordance with a first radio access technology (RAT), and performing a beam sweep procedure for one or more candidate beams for adding or handover to a second cell operating in accordance with millimeter wave (mmW) RAT. The beam sweep procedure may be performed based on previous beam measurements stored in a measurement database. The method may further include selecting a beam from the one or more candidate beams for adding or handover to the second cell based on the beam sweep procedure, and adding or handing over to the second cell by establishing a second connection with the second cell using the selected beam.

An apparatus for wireless communications at a UE is described. The apparatus may include a processor, memory coupled with the processor, and instructions stored in the memory. The instructions may be executable by the processor to cause the apparatus to establish a first connection with a first cell operating in accordance with a first radio access technology (RAT), and perform a beam sweep procedure for one or more candidate beams for adding or handover to a second cell operating in accordance with millimeter wave (mmW) RAT. The beam sweep procedure may be performed based on previous beam measurements stored in a measurement database. The instructions may be executable by the processor to further cause the apparatus to select a beam from the one or more candidate beams for adding or handover to the second cell based on the beam sweep procedure, and add or hand over to the second cell by establishing a second connection with the second cell using the selected beam.

Another apparatus for wireless communications at a UE is described. The apparatus may include means for establishing a first connection with a first cell operating in accordance with a first radio access technology (RAT), and performing a beam sweep procedure for one or more candidate beams for adding or handover to a second cell operating in accordance with millimeter wave (mmW) RAT. The beam sweep procedure may be performed based on previous beam measurements stored in a measurement database. The apparatus may further include means for selecting a beam from the one or more candidate beams for adding or handover to the second cell based on the beam sweep procedure, and adding or handing over to the second cell by establishing a second connection with the second cell using the selected beam.

A non-transitory computer-readable medium storing code for wireless communications at a UE is described. The code may include instructions executable by a processor to establish a first connection with a first cell operating in accordance with a first radio access technology (RAT), and perform a beam sweep procedure for one or more candidate beams for adding or handover to a second cell operating in accordance with millimeter wave (mmW) RAT. The beam sweep procedure may be performed based on previous beam measurements stored in a measurement database. The code may include further instructions executable by the processor to select a beam from the one or more candidate beams for adding or handover to the second cell based on the beam sweep procedure, and add or hand over to the second cell by establishing a second connection with the second cell using the selected beam.

In some examples of the method, apparatuses, and non-transitory computer-readable medium described herein, the beam sweep procedure may further include operations, features, means, or instructions for determining, based on the previous beam measurements, an order of the one or more candidate beams for performing the beam sweep procedure, and performing the beam sweep procedure of the one or more candidate beams based on the order.

In some examples of the method, apparatuses, and non-transitory computer-readable medium described herein, the order is determined based on previous beam measurements that are measured within a particular time period from a current time.

In some examples of the method, apparatuses, and non-transitory computer-readable medium described herein, the beam sweep procedure may further include determining that the UE has limited movement since performing previous beam measurements, and extending the particular time period to include additional previous beam measurements for determining the order of the one or more candidate beams.

In some examples of the method, apparatuses, and non-transitory computer-readable medium described herein, the order is determined based on the previous beam measurements that are above a particular value of Reference Signal Receiver Power (RSRP).

In some examples of the method, apparatuses, and non-transitory computer-readable medium described herein, the beam sweep procedure may further include determining, based on the previous beam measurements, a Low-Noise Amplifier (LNA) gain state to be used for Automatic Gain Control (AGC) in performing the beam sweep procedure, and performing the beam sweep procedure using the LNA gain state.

In some examples of the method, apparatuses, and non-transitory computer-readable medium described herein, the beam sweep procedure may further include determining the LNA gain state based on an intra-frequency beam sweep or an inter-frequency beam sweep.

In some examples of the method, apparatuses, and non-transitory computer-readable medium described herein, the beam sweep procedure may further include determining, based on the previous beam measurements, an early exit condition to be used for performing the beam sweep procedure, and exiting the beam sweep procedure when the early exit condition is satisfied before all of the one of more candidate beams are measured.

In some examples of the method, apparatuses, and non-transitory computer-readable medium described herein, the early exit condition may include a condition in which beam measurements satisfy an absolute threshold and a relative threshold.

In some examples of the method, apparatuses, and non-transitory computer-readable medium described herein, the early exit condition may include a condition in which beam measurements satisfy a Signal to Noise Ratio (SNR) threshold value and a Reference Signal Received Power (RSRP) threshold value.

In some examples of the method, apparatuses, and non-transitory computer-readable medium described herein, the early exit condition may include a condition in which a sufficient number of qualified beams has been found for adding or handover to the second cell.

In some examples of the method, apparatuses, and non-transitory computer-readable medium described herein, the beam sweep procedure may further include determining the order of the one or more candidate beams for performing the beam sweep procedure based on orientation and displacement of the UE.

In some examples of the method, apparatuses, and non-transitory computer-readable medium described herein, the beam sweep procedure may further include determining the order of the one or more candidate beams for performing the beam sweep procedure based on UE trajectory, UE sensor information, and beam direction information.

DETAILED DESCRIPTION

Figure 1:
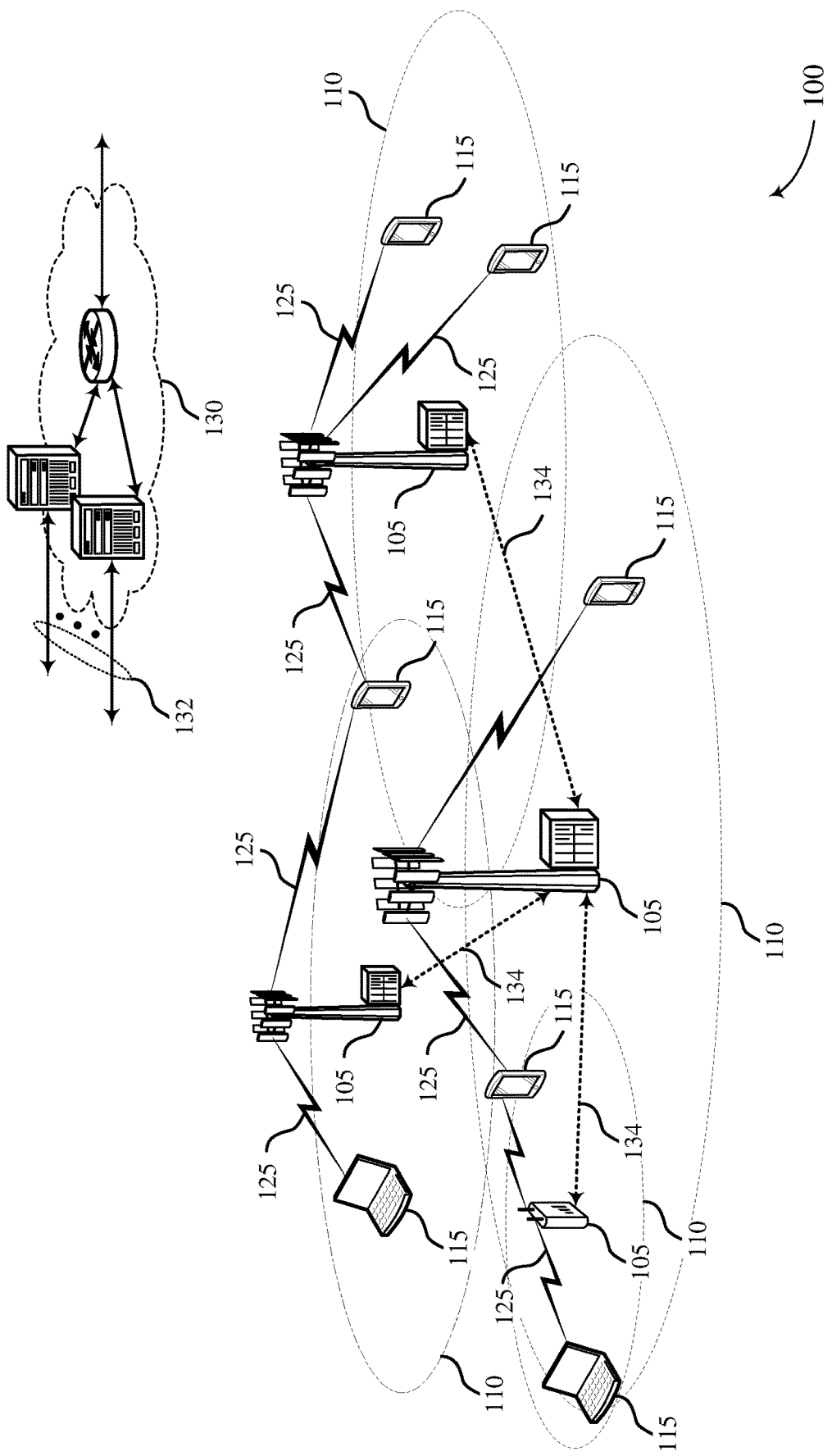
FIG. 1 illustrates an example of a system for wireless communications in accordance with aspects of the present disclosure.

A user equipment (UE) may establish a first connection with a first cell of a first radio access technology (e.g., an LTE base station). After establishing the first connection, the UE may perform a beam sweep procedure to search for a second cell (e.g., a New Radio (NR) base station) by sweeping through the receive beams of the UE for a reference signal (RS) transmission from the second cell. In some cases, the second cell may be associated with a second radio access technology (e.g., a NR cell) different from the first radio access technology associated with the first cell. In one example, the UE may perform an inter-radio access technology beam search (e.g., an LTE to NR search), scanning through its UE wide beams to find a suitable beam (e.g., a best beam) among the scanned beams.

In a conventional implementation, the UE may have scanned through beams associated with the second base station in a fixed order. For example, the UE may have first scanned a beam that is designated as a first beam in a fixed sequence of beams in the particular order (e.g., beam ID 0), followed by scanning a second beam designated as the second beam in the fixed sequence of beams in the particular order (e.g., beam ID 1), followed by scanning a third beam in the fixed sequence of beams (e.g., beam ID 2), and so on.

In the conventional implementation, the UE may scan through the entire set of beams or may scan through the set of beams until the UE identified a beam that satisfies certain criteria. However, the conventional implementation may cause certain problems. For example, the UE scanning the entire set of beams may take a considerably long period of time.

In examples described herein, a UE may establish connectivity with a first base station or a first cell that operates in accordance with a first radio access technology (RAT) (e.g., LTE). The UE may perform a beam sweep procedure (e.g., an LTE to NR (L2NR) search) to scan through UE wide beams associated with a base station or a cell of a second RAT (e.g., mmW in NR RAT). In particular, the UE may dynamically implement the beam sweep procedure based on previous beam measurements stored in a measurement database.

For example, based on previous beam measurements, the UE may determine an order of one or more candidate beams for performing the beam sweep procedure. Thus, the UE may perform the beam sweep procedure on beams that previously had good measurements first. In another example, the UE may consider previous beam measurements that are measured within a particular time period from the current time, such that more recent beam measurements are used for determining the order of beam sweep. In yet another example, the UE may determine that the UE has limited movement or displacement since performing previous beam measurements and may use older measurements for determining the order of beam sweep.

In some examples, the UE may determine the order of the beam sweep based on previous beam measurements that are above a particular value of Reference Signal Receiver Power (RSRP). For example, beams that were previously measured at above a particular RSRP value may be measured first in the order of beam sweep. In other examples, the UE may determine, based on previous beam measurements, a Low-Noise Amplifier (LNA) gain state to be used for Automatic Gain Control (AGC) in performing the beam sweep procedure. Further, the UE may determine the LNA gain state based on whether the beam sweep is for an intra-frequency beam sweep or an inter-frequency beam sweep.

In still other examples, the UE may determine, based on previous beam measurements, an early exit condition, which when satisfied, allows the UE to exit the beam sweep procedure early, e.g., ending the beam sweep procedure early before all of the candidate beams are measured. For example, the early exit condition may include absolute thresholds and/or relative thresholds related to various measurement parameters, e.g., Signal to Noise Ratio (SNR), Reference Signal Received Power (RSRP), and the like. In another example, early exit condition may include a condition in which a sufficient number of qualified beams have been found. These thresholds may be determined based on previous measurements.

In yet other examples, the order of candidate beams for the beam sweep procedure may be determined based on the orientation and/or displacement of the UE. In other examples, the UE may infer the order of candidate beams for the beam sweep procedure based on UE trajectory, UE sensor information, and beam direction information.

Based on previous beam measurements, the UE may determine a dynamic beam sweep procedure that may more efficiently detect and determine a suitable beam for adding or handover to a PSCell with less delay.

Aspects of the disclosure are initially described in the context of a wireless communications system. Aspects of the disclosure are also illustrated by a wireless communications system, an example of a paging search space configuration, and an example of a process flow. Aspects of the disclosure are further illustrated by and described with reference to apparatus diagrams, system diagrams, and flowcharts that relate to starting cell acquisition on beam selected during inter-radio access technology beam search.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

One or more of the base stations 105 may include a communication manager, which may be configured to transmit reference signals in one or more beams transmitted during certain time periods. UEs 115 may include a communication manager, which may be configured to perform a beam sweep procedure to detect and/or measure beams of a base station 105, identify a suitable beam during the beam sweep procedure, and using the identified suitable beam to perform a random access channel procedure to establish a connection with the base station 105.

Figure 2:
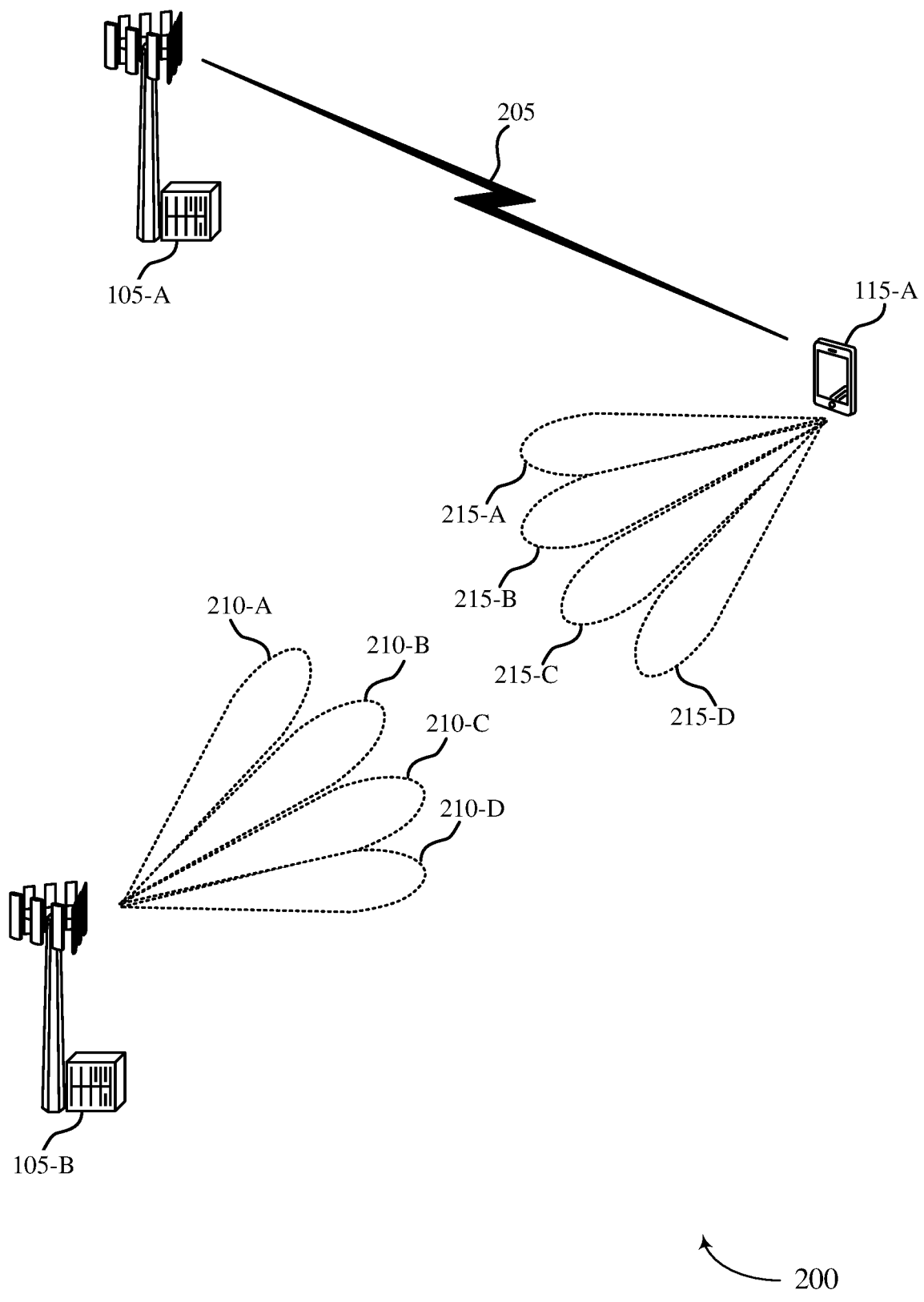
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communication system 100. Wireless communications system 200 may include a base station 105-a, a base station 105-b, and a UE 115 a, which may be examples of the corresponding devices described herein. In some examples, base station 105-a may be part of a LTE radio access technology (RAT) and base station 105-b may be part of a NR RAT. Although depicted as two separate base stations, in some examples, base station 105-a and base station 105-b may be part of the same physical base station cell tower. For example, a cell tower may include both the LTE RAT and the NR RAT.

In one example, UE 115-a may establish a communication link 205 with base station 105-a in accordance with a first RAT (e.g., LTE). In some cases, UE 115-a may be configured to establish and/or request to establish communication link 205 with base station 105-a. In some cases, UE 115-a may transmit data to base station 105-a over communication link 205 and/or may receive data from base station 105-a over communication link 205.

In one example, base station 105-b may operate in accordance with a second RAT (e.g. NR with mmW communication) and transmit a plurality of reference signals to UEs located within a coverage area of base station 105-b, including UE 115 a. The reference signals may be transmitted using beams 210. In some cases, each beam 210 may have an associated paging occasion during with a paging transmission may be quasi-co-located (QCL) with a corresponding synchronization signal block (SSB). The UE 115 a may use beams 215 for uplink transmissions, and beamforming parameters for beams 215 may be used for both uplink transmissions and downlink transmissions. While the illustration in FIG. 2 shows beamformed transmissions between base station 105-b and UE 115-a, techniques provided herein may be applied to other types of transmissions as well.

While connected to base station 105-*a* via communication link 205, UE 115-*a* may perform one or more beam sweep procedures (e.g., an LTE to NR (L2NR) search) and perform one or more measurements based on the one or more beam sweep procedures. In one example, UE 115-*a* may establish connectivity with base station 105-*a* in accordance with a first RAT (e.g., LTE), and perform a beam sweep procedure, such as an inter-radio access technology beam search attempting to identify a second base station (e.g., base station 105-*b*) operating in accordance with a second RAT (e.g., NR with mmW). As indicated, base station 105-*b* may periodically transmit a reference signal during set time periods using respective beams. For example, base station 105-*b* may transmit a reference signal during a first time period (e.g., via transmit beam 210-*a*), then base station 105-*b* may transmit the reference signal in a second time period (e.g., via transmit beam 210-*b*), and so on. In some cases, UE 115-*a* may perform one or more measurements based on the transmissions from base station 105-*b*. For example, UE 115-*a* may perform one or more measurements for each reference signal transmitted by base station 105-*b*. Examples of measurements UE 115-*a* may perform include at least one of a bit energy, a noise spectral density, a signal measurement, a signal quality measurement, a signal power measurement, a signal to noise ratio, a signal-to-interference-plus-noise ratio (SINR), a received signal strength indicator (RSSI), a reference signal received power (RSRP), a reference signal received quality (RSRQ), or a received signal code power (RSCP), or the like, or any combination thereof.

In some examples, UE 115-*a* may perform the beam sweep procedure based on previous beam measurements stored in a measurement database. For example, results of beam measurements previously performed by UE 115-*a* may be stored in a measurement database. In an example, UE 115-*a* may determine a particular order in which different beams are measured based on the previous beam measurements. For example, previous beam measurements that are above a certain quality threshold may be measured first. In another example, UE 115-*a* may determine an early exit condition based on the previous beam measurements. UE 115-*a* may exit the beam sweep procedure early, before all candidate beams are measured. This allows the beam sweep procedure to end early, reducing delay. For example, UE 115-*a* may end the beam sweep procedure early, if an adequate number of suitable beams are found, without measuring all candidate beams. In still another example, UE 115-*a* may determine a Low-Noise Amplifier (LNA) gain state to be used for Automatic Gain Control (AGC) in performing the beam sweep procedure.

In some examples, UE 115-*a* may identify which beam from beams 215 is a suitable beam (e.g., the best beam). The identified beam may be the beam that provides, for example, a certain level of measured received power, the beam that provides a certain level of measured signal quality, the beam that provides a certain level of measured signal code power, the beam that provides a certain level of measured signal to noise ratio, the beam that provides a certain level of measured signal-to-interference-plus-noise ratio, or the like. After determining which beam is suitable to use, UE 115-*a* may use the suitable beam to add or handover communication to a PSCell, e.g., base station 105-*b*. For example, UE 115-*a* may use the suitable beam to perform a random access channel (RACH) procedure to establish a connection with base station 105-*b*.

After determining the suitable beam, UE 115-*a* may perform the RACH procedure attempting to establish connectivity with the base station 105-*b* that operates in accordance with the second RAT. In some examples, the RACH procedure may include UE 115-*a* performing a handshake that involves exchanging two or more RACH messages with base station 105-*b*. In some cases, UE 115-*a* may establish a communication link with base station 105-*b* based on the RACH procedure. In some cases, UE 115-*a* may use the suitable beam identified using the inter-RAT beam sweep procedure to send the RACH message to base station 105-*b*. In some cases, the UE 115-*a* may drop communication link 205 with base station 105-*a* after UE 115-*a* establishes a communication link with base station 105-*b*. In some cases, UE 115-*a* may maintain communication link 205 with base station 105-*a* after UE 115-*a* establishes a communication link with base station 105-*b*.

Figure 3:
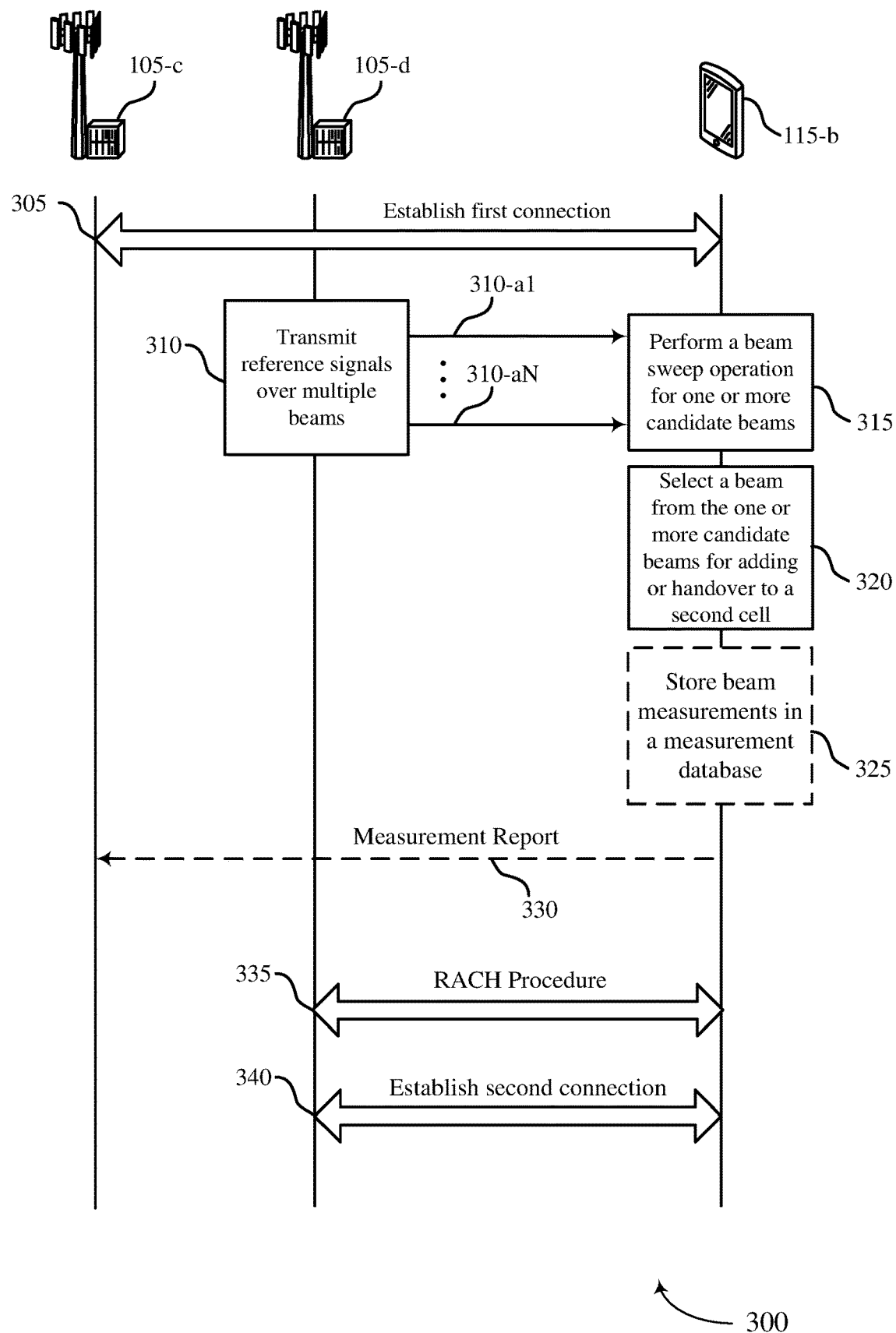
FIG. 3 illustrate an example of a process flow in accordance with aspects of the present disclosure.

FIG. 3 illustrates an example of a process flow 300 in accordance with aspects of the present disclosure. In some examples, process flow 300 may implement aspects of wireless communications systems 100 and/or 200. Process flow 300 may include UE 115-*b*, base station 105-*c*, and base station 105-*d*, which may be examples of corresponding base stations 105 and UEs 115, respectively, as described above with reference to FIGS. 1 and 2. Additionally, process flow 300 may illustrate a two-step RACH procedure as described herein for UE 115-*b* to establish a connection with base station 105-*d* for subsequent communications.

At 305, UE 115-*b* may establish a first connection with base station 105-*c*, e.g., a first cell. In some examples, base station 105-*c* may be associated with a first radio access technology (RAT) and base station 105-*d*, e.g., a second cell, may be associated with a second RAT different from the first RAT. In one example, the first RAT may be a Long Term Evolution (LTE) RAT and the second RAT may be a New Radio (NR) RAT configured to communicate in mmW. Thus, base station 105-*c* may be configured to operate in accordance with a LTE RAT and base station 105-*d* may be configured to operate in accordance with a NR RAT.

At 310, base station 105-*d* may transmit one or more reference signals over multiple transmit beams. For example, base station 105-*d* may transmit N beams over N different time periods (e.g., N consecutive time periods). For instance, base station 105-*d* may use a first reference signal transmission 310-*a*1 to transmit a reference signal during a first time period, use a second beam to transmit the reference signal during a second time period, and so forth, and finally use an Nth reference signal transmission 310-*a*N to transmit a reference signal during the Nth time period.

At 315, UE 115-*b* may perform a beam sweep procedure (e.g., inter-radio access technology beam search or intra-radio access technology beam search) of one or more candidate beams transmitted by base station 105-*d*. In some cases, UE 115-*b* may use respective UE beams (e.g., receive beams 215-*a* to 215-*d*) to take signal measurements of the reference signal transmissions 310-*a*1 through 310-*a*N transmitted by base station 105-*d* at the associated time periods using the respective transmit beams (e.g., transmit beams 220-*a* to 220-*d*). In one example, UE 115-*b* may cycle through UE receive beams to measure a reference signal in first reference signal transmission 310-*a*1 transmitted by base station 105-*d* at the first time period, cycle through UE receive beams to measure a reference signal in a second beam transmitted by base station 105-*d* at a second time period after the first time period, and so forth. Finally, UE 115-*b* may cycle through UE receive beams to measure a reference signal in Nth reference signal transmission 310-*a*N transmitted by base station 105-*d* at the Nth time period.

In some examples, UE 115-*b* may perform the beam sweep procedure based on previous beam measurements stored in a measurement database. In particular, based on previous beam measurements, UE 115-*b* may dynamically determine an order of the one or more candidate beams for performing the beam sweep procedure. For example, in an initial beam sweep procedure where no previous measurements were recently made, UE 115-*b* may determine to measure the one or more candidate beams in a random order or in a round robin manner. When previous beam measurements are available, UE 115-*b* may determine an order of the one or more candidate beams based on the quality of previous measurements. For example, UE 115-*b* may give priority to beams that have previous reference signal received power (RSRP) measurements above a particular value (e.g., −100 dBm). As such, candidate beams that had good measurements may be measured first to increase the probability and reduce the time of finding qualified beams.

In some examples, UE 115-*b* may determine the order of the one or more candidate beams based on previous beam measurements that are measured within a particular time period from a current time. For example, previous beam measurements that are more recent may be weighted more for considering the order of measurement. Previous beam measurements that are older may be weighted less or not be considered for the order of measurement.

In some examples, UE 115-*b* may determine that the UE has limited movement since performing previous beam measurements and may extend the particular time period to include additional previous beam measurements for determining the order of the one or more candidate beams. For example, UE 115-*b* may include various sensors, such as Global Positioning System (GPS) sensors, magnetometer, gyroscope, accelerometer sensor, and the like, that may measure the orientation and disposition of UE 115-*b*. UE 115-*b* may determine that the UE has limited movement and/or limited displacement and may use older beam measurements for determining the order of measurements in the beam sweep procedure.

In some examples, UE 115-*b* may determine, based on previous beam measurements, a Low-Noise Amplifier (LNA) gain state to be used for Automatic Gain Control (AGC) in performing the beam sweep procedure. US 115-*b* also may determine the LNA gain state based on intra- or inter-frequency sweep. For example, if the previous measurement is less than 0.5 millisecond (ms) old, UE 115-*b* may determine to use the same LNA for performing an inter-frequency sweep. If the previous measurement is more than 0.5 ms old, UE 115-*b* may determine to use default LNA for inter-frequency sweep. UE 115-*b* may determine to use continue traffic mode LNA for intra-frequency sweep.

In some examples, based on previous beam measurements, UE 115-*b* may dynamically determine an early exit condition for performing the beam sweep procedure. The early exit condition, if satisfied, may allow UE 115-*b* to exit the beam sweep procedure early, before all of the candidate beams are measured. This may reduce delay in the beam sweep procedure. For example, UE 115-*b* may determine an early exit condition related to measurements satisfying certain thresholds, such as a Signal to Noise Ratio (SNR) threshold value and/or a RSRP threshold value. In another example early exit condition, UE 115-*b* may determine to exit the beam sweep procedure early when a sufficient number of suitable beams are found.

Below are several example scenarios in which UE 115-*b* may dynamically perform a beam sweep procedure based on previous beam measurements.

Blind Sweep Scenario

When previous measurements are not available or previous measurements are too old, UE 115-*b* may perform a blind sweep in which the candidate beams are measured in a random order or in a round robin manner. The blind sweep scenario may be applicable when UE 115-*b* enters a relatively new environment or connecting to new cells. In the blind sweep scenario, UE 115-*b* may determine an early exit condition in which UE 115-*b* may exit the blind sweep procedure early when SNR>10 dB and RSRP>80-dBm. UE 115-*b* may dynamically adjust or modify the early exit thresholds as appropriate. In the blind sweep scenario, UE 115-*b* may determine to use continue mode LNA for intra-frequency sweeps and use default LNA for inter-frequency sweeps.

Measurement Based, Target Cell Info Stale Scenario

When previous measurements for a target cell are available, but are relatively old (e.g., more than 0.5 ms), UE 115-*b* may determine an order for the candidate beams based on previous measurements that are more recent. For example, UE 115-*b* may select candidate beams that have previous measurements less than 1.5 second old and have RSRP>−100 dBm. These candidate beams may be measured first. Secondly, UE 115-*b* may then order the remaining candidate beams that have previous measurements in the measurement database. Finally, UE 115-*b* may measure candidate beams that have no previous measurement in a round robin manner. In this scenario, UE 115-*b* may determine an early exit condition in which:

$$\text{SNR}>10 \text{ dB AND RSRP}>\min(\max(\text{RSRP\_MDB}-2 \text{ dB}, -100 \text{ dBm}), -80 \text{ dBm}),$$

where RSRP_MDB is the previous RSRP measurement stored in the measurement database. As such, the early exit condition may include relative and absolute thresholds. In this scenarios, UE 115-*b* may determine to use continue traffic mode LNA for intra-frequency sweep and use default LNA for inter-frequency sweep.

Measurement Based, Target Cell Info Fresh Scenario

When previous measurements for a target cell are available and relatively fresh (e.g., less than 0.5 ms), UE 115-*b* may select a suitable beam using the previous beam measurements and may perform RACH directly without preforming a beam sweep procedure. In this scenario, UE 115-*b* may use continue traffic mode LNA for intra-frequency and use the LNA from previous measurements as indicated in the measurement database. However, if the RACH fails, UE 115-*b* may fall back to the dynamic beam sweep procedure as the one used in the target cell info stale scenario.

The above examples and scenarios may be applicable for both adding and switch (handover) to a PSCell. In some examples, UE 115-*b* may dynamically adjust or update various threshold values or conditions to improve measurement efficiency. For example, UE 115-*b* may use information related to UE 115-*b*'s orientation and displacement to determine the beam sweep procedure. For example, UE 115-*b* may determine that UE 115-*b* had limited movement or displacement, UE 115-*b* may relax the conditions, such as the timer threshold, such that older measurements may be considered for the dynamic beam sweep procedure. In some examples, UE 115-*b* may project or infer suitable beams based on trajectory, sensor information, and/or beam direction information. For example, UE 115-*b* may infer or project suitable beams based on UE 115-*b*'s travel direction and speed. Accordingly, UE 115-*b* may determine a dynamic beam sweep procedure based on previous measurements that may improve measurement efficiency and reduce delay.

At 320, UE 115-*b* may select, based on analysis of the signal measurements, a suitable UE beam for UE 115-*b* for adding or handover to a second cell by establishing a second connection with base station 105-*d*. For example, UE 115-*b* may determine that the signal measurements indicate a particular receive beam (e.g., beam 215-*c*) used by UE 115-*b* during the beam sweep operation at 415 has adequate signal measurements (e.g., the beam with a certain level of signal quality measurement, the beam with a certain level of signal power measurement, etc.).

At 325, UE 115-*b* may store certain data related to the beam measurements in a measurement database. In some cases, the measurement database may be located at least partially in UE 115-*b*. In some cases, the measurement database may be located at least partially in a base station (e.g., base station 105-*c*, base station 105-*d*, etc.). In some examples, UE 115-*b* may store data associated with the identified suitable beam in the measurement database (e.g., beam identifier, beam configuration data, beam direction, beam strength, etc.). The stored beam measurements may be used by UE 115-*b* later to perform dynamic beam sweep procedures.

At 330, UE 115-*b* may optionally transmit a measurement report to base station 105-*a*. In some cases, the measurement report may include one or more metrics associated with the beam sweep procedure of 315.

At 335, UE 115-*b* may perform a random access channel (RACH) procedure with base station 105-*d*. In some cases, UE 115-*b* may perform the RACH procedure based at least in part on the suitable beam identified by the UE 115-*b* at 320.

At 340, UE 115-*b* may add or switch/handover to the second cell, e.g., a mmW PSCell, by establishing a second connection with base station 105-*d* based on the RACH procedure of 335. In some cases, UE 115-*b* may use the best beam to communicate with base station 105-*d* over the second connection established at 340.

UE 115-*b* may avoid certain problems with conventional techniques (e.g., time delay to establish a connection with base station 105-*d* operating in accordance with a different RAT, reduced data throughput over the connection with base station 105-*d* using an inferior beam, etc.) by performing a dynamic beam sweep procedure, instead of performing a conventional scan of the beams transmitted by base station 105-*d* in reference signal transmissions 310 in a particular order (e.g., beam ID 0, beam ID 1, etc.). Based on previous beam measurements, UE 115-*b* may dynamically determine an order for measuring candidates beams, an early exit condition, and/or other beam measurement criteria that may help increase efficiency and reduce delay when adding or handover to the second cell, e.g., a mmW PSCell.

Figure 4:
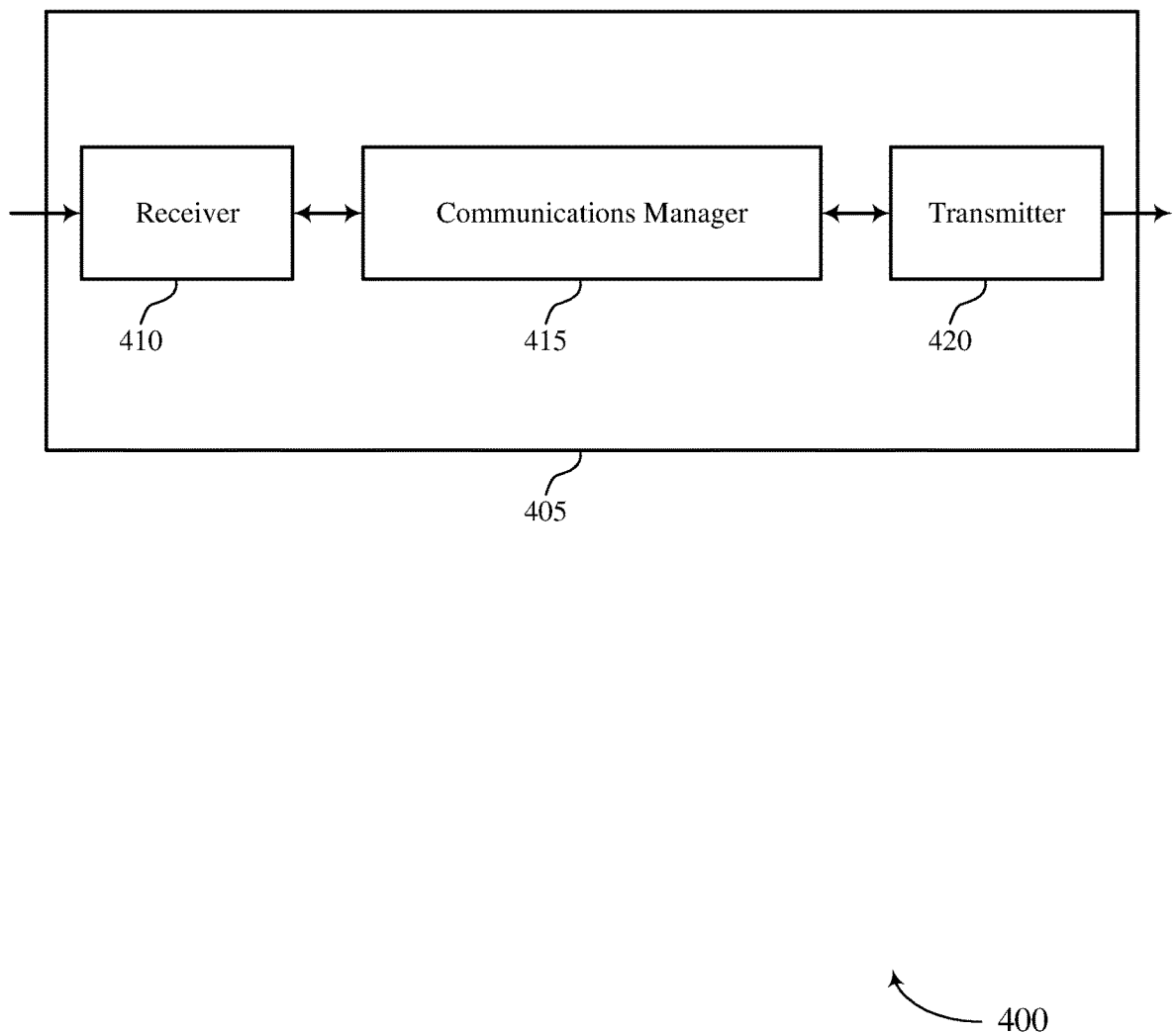
FIGS. 4 and 5 show block diagrams of devices that support dynamic beam sweep procedures for adding or switch/handover to a PSCell with aspects of the present disclosure.

FIG. 4 shows a block diagram 400 of a device 405 in accordance with aspects of the present disclosure. The device 405 may be an example of aspects of a UE 115 or base station 105 as described herein. The device 405 may include a receiver 410, a communications manager 415, and a transmitter 420. The device 405 may also include a processor. Each of these components may be in communication with one another (e.g., via one or more buses).

Receiver 410 may receive information such as packets, user data, or control information associated with various information channels (e.g., control channels, data channels, and information related to starting cell acquisition or handover on beam selected during inter- or intra-radio access technology beam search, etc.). Information may be passed on to other components of the device 405. The receiver 410 may be an example of aspects of the transceiver 720 or 820 as described with reference to FIGS. 7 and 8. The receiver 410 may utilize a single antenna or a set of antennas.

The communications manager 415 may establish a first connection with a first base station or a first cell operating in accordance with a first RAT, and perform a beam sweep procedure for one or more candidate beams for adding or handover to a second cell operating in accordance with millimeter wave (mmW) RAT. The beam sweep procedure may be performed based on previous beam measurements stored in a measurement database. The communications manager 415 may further select a beam from the one or more candidate beams for adding or handover to the second cell based on the beam sweep procedure, and add or handover to the second cell by establishing a second connection with the second cell using the selected beam. The communications manager 415 may be an example of aspects of the communications manager 710 or 810 as described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 420 may transmit signals generated by other components of the device 405. In some examples, the transmitter 420 may be collocated with a receiver 410 in a transceiver module. For example, the transmitter 420 may be an example of aspects of the transceiver 720 or 820 as described with reference to FIGS. 7 and 8. The transmitter 420 may utilize a single antenna or a set of antennas.

Figure 5:
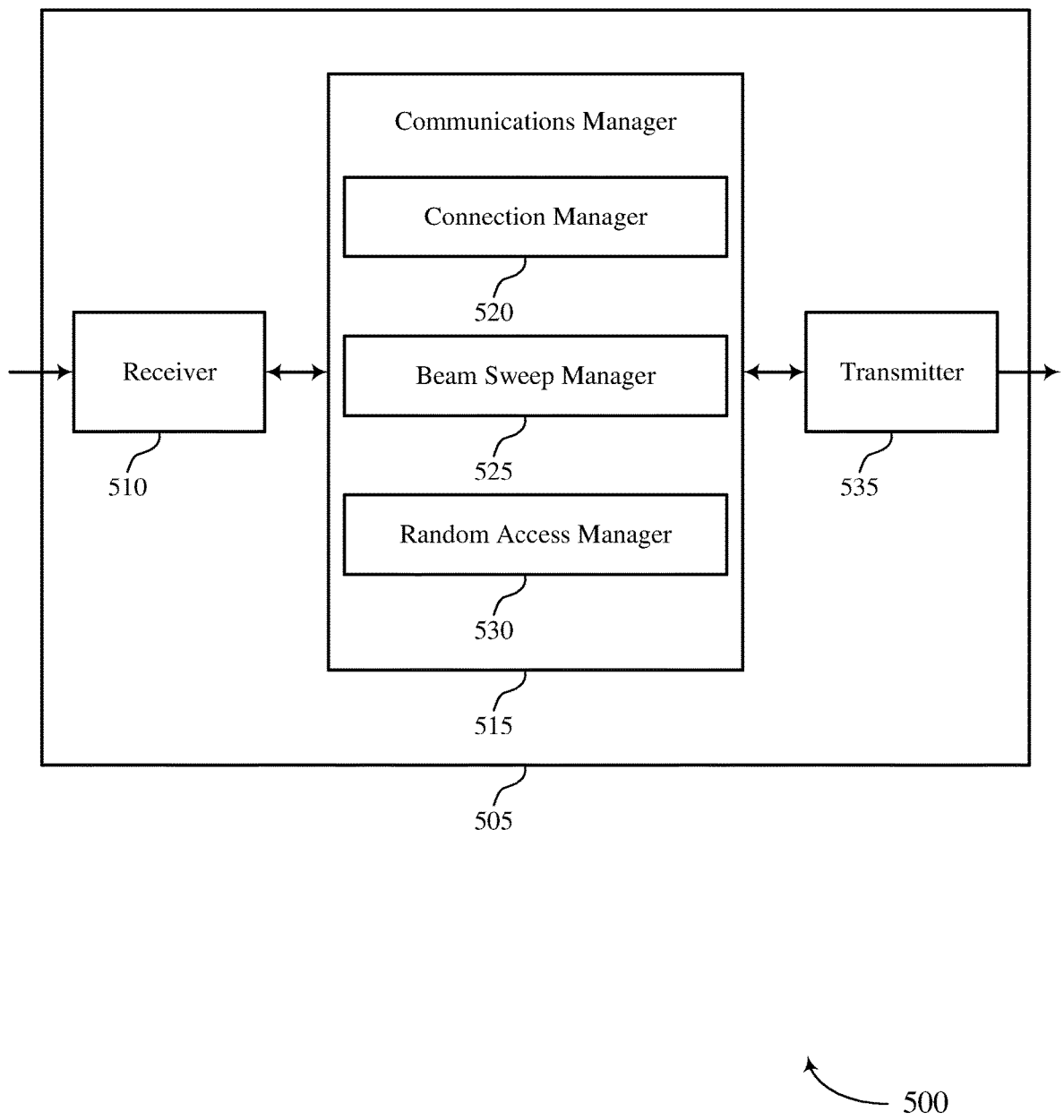

FIG. 5 shows a block diagram 500 of a device 505 in accordance with aspects of the present disclosure. The device 505 may be an example of aspects of a device 405, a UE 115, or a base station 105 as described herein. The device 505 may include a receiver 510, a communications manager 515, and a transmitter 535. The device 505 may also include a processor. Each of these components may be in communication with one another (e.g., via one or more buses).

Receiver 510 may receive information such as packets, user data, or control information associated with various information channels (e.g., control channels, data channels, and information related to starting cell acquisition on beam selected during inter-radio access technology beam search, etc.). Information may be passed on to other components of the device 505. The receiver 510 may be an example of aspects of the transceiver 720 or 820 as described with reference to FIGS. 7 and 8. The receiver 510 may utilize a single antenna or a set of antennas.

The communications manager 515 may be an example of aspects of the communications manager 415 as described herein. The communications manager 515 may include a connection manager 520, a beam sweep manager 525, and a random access manager 530. The communications manager 515 may be an example of aspects of the communications manager 710 or 810 as described herein.

The connection manager 520 may establish a first connection with a first base station operating in accordance with a first RAT.

The beam sweep manager 525 may perform a dynamic beam sweep procedure for one or more candidate beams for adding or handover to a second cell operating in accordance with millimeter wave (mmW) RAT.

The random access manager 530 may perform a random access channel procedure using the first beam attempting to establish a second connection with a second base station, the second base station operating in accordance with the second RAT.

Transmitter 535 may transmit signals generated by other components of the device 505. In some examples, the transmitter 535 may be collocated with a receiver 510 in a transceiver module. For example, the transmitter 535 may be an example of aspects of the transceiver 720 or 820 as described with reference to FIGS. 7 and 8. The transmitter 535 may utilize a single antenna or a set of antennas.

Figure 6:
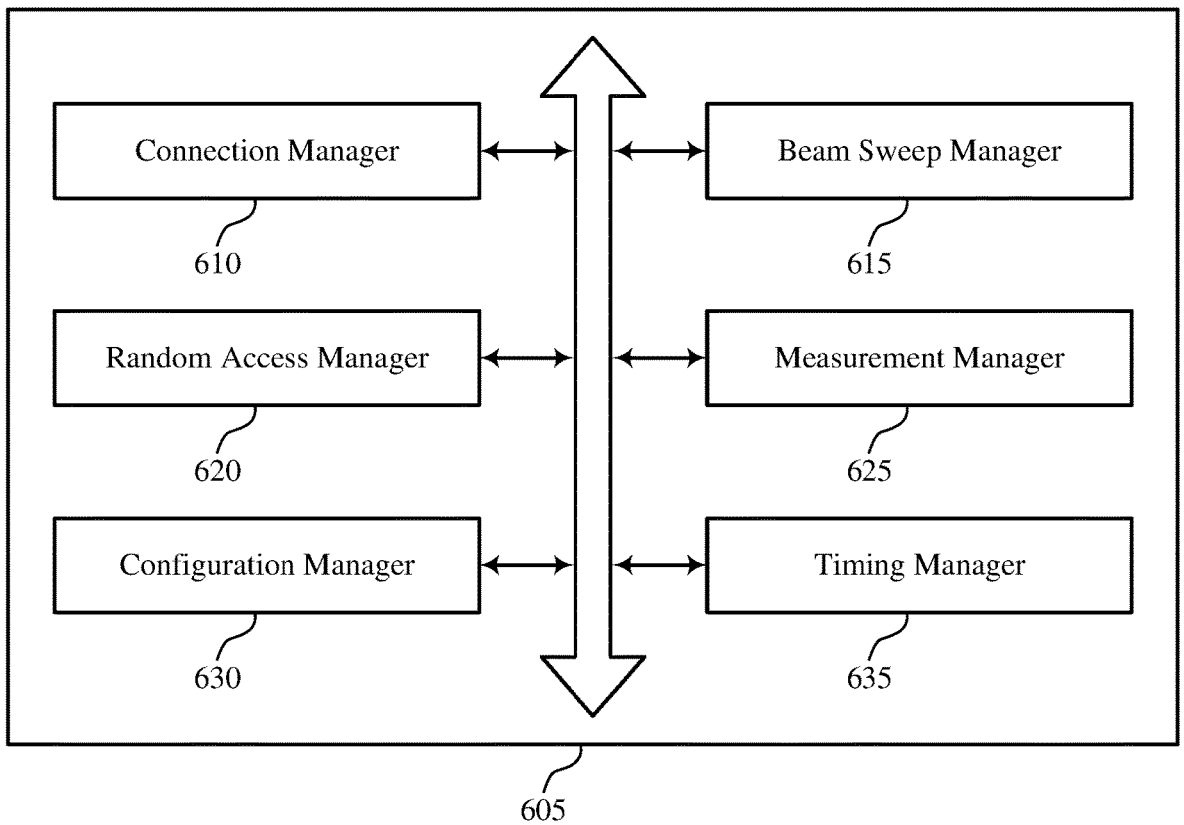
FIG. 6 shows a block diagram of a communications manager in accordance with aspects of the present disclosure.

FIG. 6 shows a block diagram 600 of a communications manager 605 in accordance with aspects of the present disclosure. The communications manager 605 may be an example of aspects of a communications manager 415, a communications manager 515, or a communications manager 710 described herein. The communications manager 605 may include a connection manager 610, a beam sweep manager 615, a random access manager 620, a measurement manager 625, a configuration manager 630, and a timing manager 635. Each of these modules may communicate, directly or indirectly, with one another (e.g., via one or more buses).

The connection manager 610 may establish a first connection with a first base station operating in accordance with a first RAT. In some examples, the connection manager 610 may identify a failure to establish the second connection using the first beam. In some examples, the connection manager 610 may establish the second connection with the second base station using a second beam of the set of different beams.

In some examples, the connection manager 610 may select the first beam to be an initial beam used to attempt to establish the second connection with the second base station based on the order. In some examples, the connection manager 610 may communicate with the second base station based on the second connection. In some examples, the connection manager 610 may establish the second connection with the second base station using the first beam. In some cases, the first RAT is a LTE RAT and the second RAT is a New Radio (NR) RAT.

The beam sweep manager 615 may perform a beam sweep procedure for one or more candidate beams for adding or handover to a second cell, e.g., second base station, operating in accordance with millimeter wave (mmW) RAT. In some examples, the beam sweep manager 615 may select a beam from the one or more candidate beams for adding or handover to a second cell based on the measurements. In some cases, the measurement is a signal quality measurement, a signal power measurement, a reference signal received power (RSRP) measurement, a reference signal received quality measurement (RSRQ), a signal measurement, or any combination thereof.

In some examples, the beam sweep manager 615 may determine, based on the previous beam measurements, an order of the one or more candidate beams for performing the beam sweep procedure. In some examples, the beam sweep manager 715 may determine an early exit condition for the beam sweep procedure. In some cases, each of the set of beams is a wide beam.

The random access manager 620 may perform a random access channel procedure using the selected beam attempting to establish a second connection with a second cell or a second base station.

The measurement manager 625 may transmit a measurement report to the first base station that indicates a metric measured using the first beam. In some examples, the measurement manager 625 may receive a configuration message from the first base station that indicates at least one parameter of the second RAT. The measurement manager 625 may store previous beam measurements in a measurement database.

In some examples, the measurement manager 625 may generate a measurement of at least one reference signal transmission using each beam of the set of different beams. In some examples, the measurement manager 625 may determine that a measurement of the first beam satisfies a threshold. In some cases, the measurement is a signal quality measurement, a signal power measurement, a reference signal received power (RSRP) measurement, a reference signal received quality measurement (RSRQ), a signal measurement, or any combination thereof.

The configuration manager 630 may receive the configuration message that indicates a New Radio (NR) cell associated with the second base station. The timing manager 635 may determine that a time period has elapsed since performing a beam sweep procedure.

Figure 7:
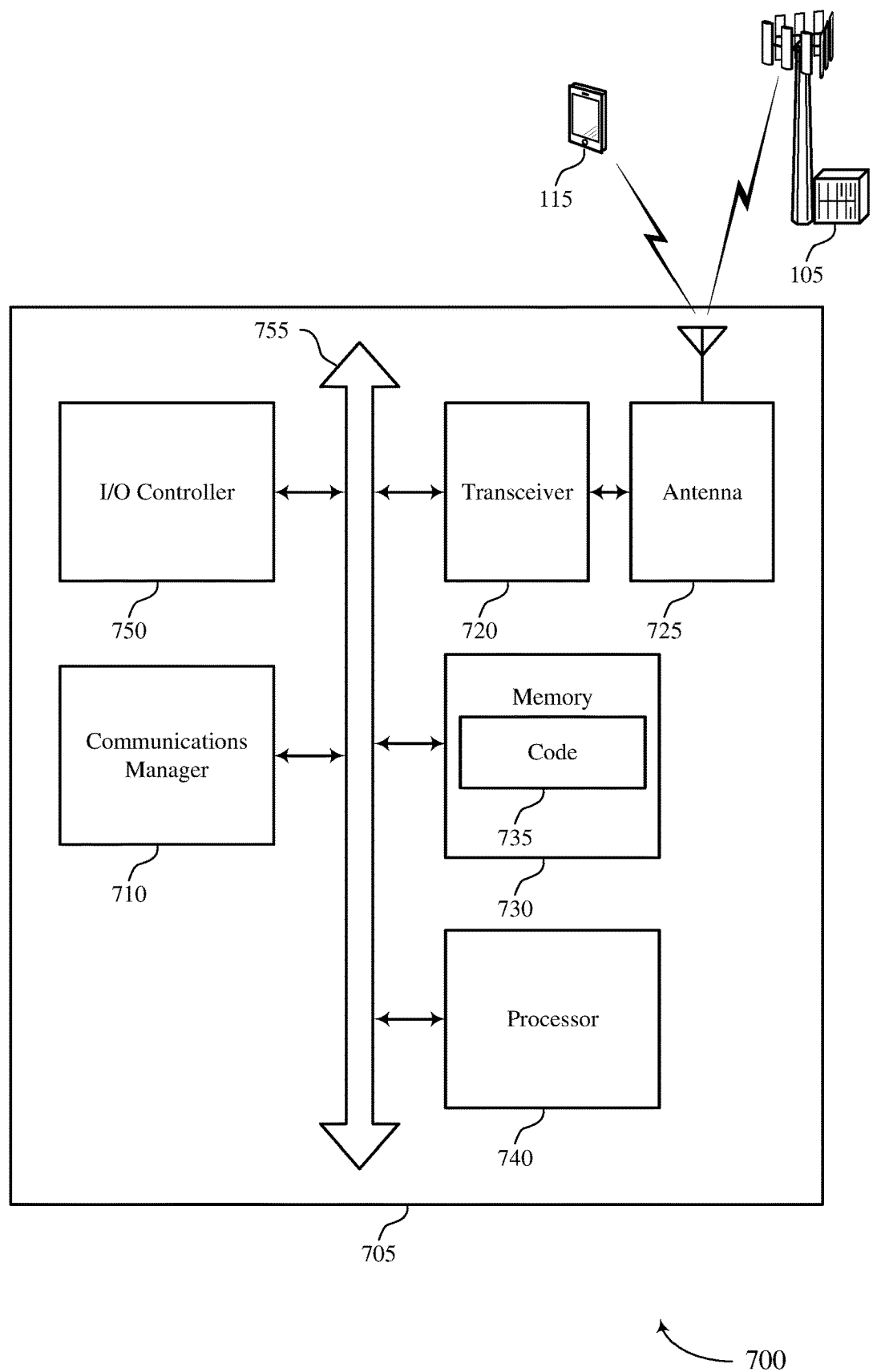
FIG. 7 shows a diagram of a system including a user equipment (UE) in accordance with aspects of the present disclosure.

FIG. 7 shows a diagram of a system 700 including a device 705 in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, a transceiver 720, an antenna 725, memory 730, a processor 740, and an I/O controller 750. These components may be in electronic communication via one or more buses (e.g., bus 755).

The communications manager 710 may establish a first connection with a first base station or a first cell operating in accordance with a first RAT, and perform a beam sweep procedure for one or more candidate beams for adding or handover to a second cell operating in accordance with millimeter wave (mmW) RAT. The beam sweep procedure may be performed based on previous beam measurements stored in a measurement database. The communications manager 710 may further select a beam from the one or more candidate beams for adding or handover to a second base station or a second cell based on the beam sweep procedure, and add or handover to the second cell by establishing a second connection with the second cell using the selected beam.

Transceiver 720 may communicate bi-directionally, via one or more antennas, wired, or wireless links as described above. For example, the transceiver 820 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM, ROM, or a combination thereof. The memory 730 may store computer-readable code 735 including instructions that, when executed by a processor (e.g., the processor 740) cause the device to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting starting cell acquisition on beam selected during inter-radio access technology beam search).

The I/O controller 750 may manage input and output signals for the device 705. The I/O controller 750 may also manage peripherals not integrated into the device 705. In some cases, the I/O controller 750 may represent a physical connection or port to an external peripheral. In some cases, the I/O controller 750 may utilize an operating system such as iOS®, ANDROID®, MS-DOS®, MS-WINDOWS®, OS/2®, UNIX®, LINUX®, or another known operating system. In other cases, the I/O controller 750 may represent or interact with a modem, a keyboard, a mouse, a touchscreen, or a similar device. In some cases, the I/O controller 750 may be implemented as part of a processor. In some cases, a user may interact with the device 705 via the I/O controller 750 or via hardware components controlled by the I/O controller 750.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
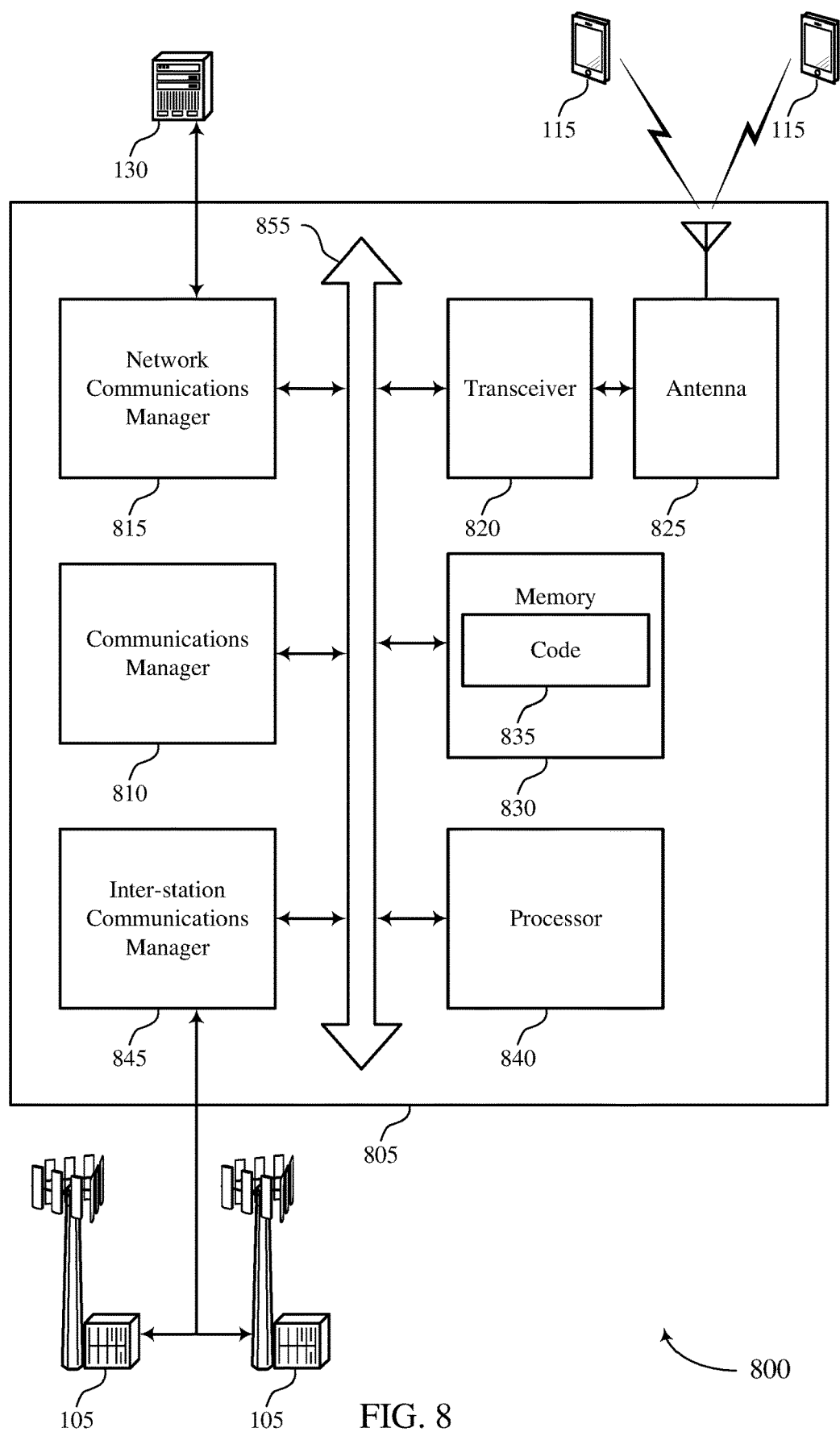
FIG. 8 shows a diagram of a system including a base station in accordance with aspects of the present disclosure.

FIG. 8 shows a diagram of a system 800 including a device 805 in accordance with aspects of the present disclosure. The device 805 may be an example of or include the components of device 405, device 505, or a base station 105 as described herein. The device 805 may include components for bi-directional voice and data communications including components for transmitting and receiving communications, including a communications manager 810, a network communications manager 815, a transceiver 820, an antenna 825, memory 830, a processor 840, and an inter-station communications manager 845. These components may be in electronic communication via one or more buses (e.g., bus 855).

The communications manager 810 may establish communication connections with UEs 115 and may transmit reference signals to be measured by UEs 115 in a beam sweep procedure. The communication manager 810 may be configured to operate in LTE and/or NR with mmW.

Network communications manager 815 may manage communications with the core network (e.g., via one or more wired backhaul links). For example, the network communications manager 815 may manage the transfer of data communications for client devices, such as one or more UEs 115.

Transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (e.g., the processor 840) cause the device to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting starting cell acquisition on beam selected during inter-radio access technology beam search).

Inter-station communications manager 845 may manage communications with other base station 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, inter-station communications manager 845 may provide an X2 interface within an LTE/LTE-A wireless communication network technology to provide communication between base stations 105.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
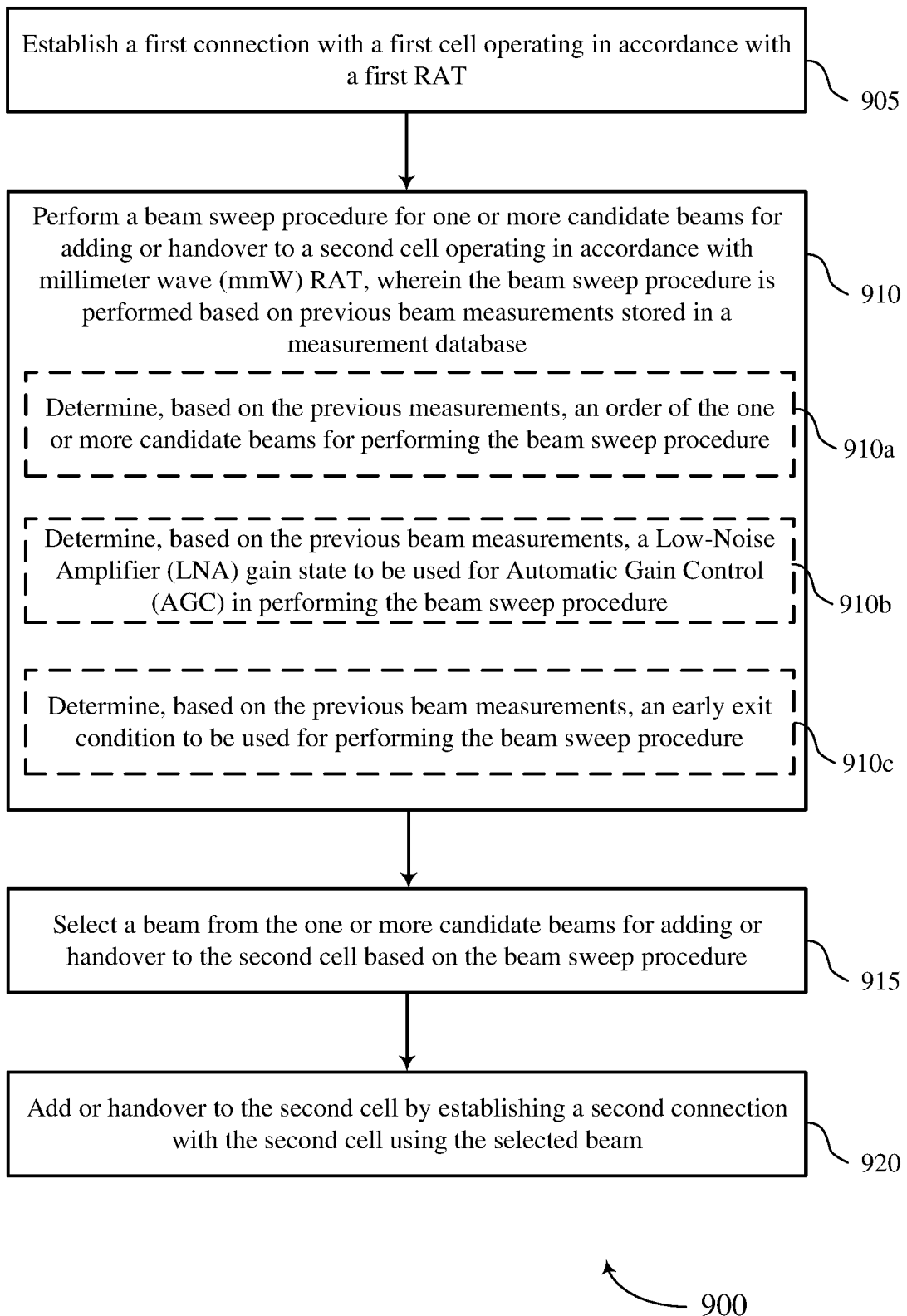
FIG. 9 shows a flowchart illustrating methods that support dynamic beam sweep procedures for adding or switch/handover to a PSCell in accordance with aspects of the present disclosure.

FIG. 9 shows a flowchart illustrating a method 900 in accordance with aspects of the present disclosure. The operations of method 900 may be implemented by a UE 115 or its components as described herein. For example, the operations of method 900 may be performed by a communications manager as described with reference to FIGS. 4 through 8. In some examples, a UE may execute a set of instructions to control the functional elements of the UE or base station to perform the functions described below. Additionally or alternatively, a UE may perform aspects of the functions described below using special-purpose hardware.

At step 905, the UE may establish a first connection with a first base station operating in accordance with a first RAT. The operations of 905 may be performed according to the methods described herein. In some examples, aspects of the operations of 905 may be performed by a connection manager as described with reference to FIGS. 4 through 8.

At step 910, the UE may perform a beam sweep procedure for one or more candidate beams for adding or handover to a second cell operating in accordance with millimeter wave (mmW) RAT. The operations of 910 may be performed according to the methods described herein. In some examples, aspects of the operations of 910 may be performed by a beam sweep manager as described with reference to FIGS. 5 through 8.

In some examples, the beam sweep procedure may include step 910a in which the UE may determine, based on the previous beam measurements, an order of the one or more candidate beams for performing the beam sweep procedure. In some examples, the beam sweep procedure may include step 910b in which the UE may determine, based on the previous beam measurements, a Low-Noise Amplifier (LNA) gain state to be used for Automatic Gain Control (AGC) in performing the beam sweep procedure. In some examples, the beam sweep procedure may include step 910c in which the UE may determine, based on the previous beam measurements, an early exit condition to be used for performing the beam sweep procedure.

At step 915, the UE may select a beam from the one or more candidate beams for adding or handover to the second cell based on the beam sweep procedure. The operations of 915 may be performed according to the methods described herein. In some examples, aspects of the operations of 915 may be performed by a beam sweep manager as described with reference to FIGS. 5 through 8.

At step 920, the UE may add or handover to a second cell or a second base station by establishing a second connection with the second cell or the second base station using the selected beam. The operations of 920 may be performed according to the methods described herein. In some examples, aspects of the operations of 920 may be performed by a communications manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A method for wireless communications at a user equipment (UE), comprising:
    establishing a first connection with a first cell operating in accordance with a first radio access technology (RAT);
    performing a beam sweep procedure for one or more candidate beams for adding or handover to a second cell operating in accordance with millimeter wave (mmW) RAT, wherein the beam sweep procedure is performed based on previous beam measurements stored in a measurement database and based on a determination of limited movement by the UE since performing previous beam measurements;
    selecting a beam from the one or more candidate beams for adding or handover to the second cell based on the beam sweep procedure; and
    adding or handing over to the second cell by establishing a second connection with the second cell using the selected beam.

2. The method of claim 1, wherein the beam sweep procedure further comprises:
    determining, based on the previous beam measurements, an order of the one or more candidate beams for performing the beam sweep procedure; and
    performing the beam sweep procedure of the one or more candidate beams based on the order.

3. The method of claim 2, wherein the order is determined based on previous beam measurements that are measured within a particular time period from a current time.

4. The method of claim 3, wherein the beam sweep procedure further comprises:

extending the particular time period to include additional previous beam measurements for determining the order of the one or more candidate beams.

5. The method of claim 2, wherein the order is determined based on the previous beam measurements that are above a particular value of Reference Signal Receiver Power (RSRP).

6. The method of claim 1, wherein the beam sweep procedure further comprises:
determining, based on the previous beam measurements, a Low-Noise Amplifier (LNA) gain state to be used for Automatic Gain Control (AGC) in performing the beam sweep procedure; and
performing the beam sweep procedure using the LNA gain state.

7. The method of claim 6, wherein the beam sweep procedure further comprises determining the LNA gain state based on an intra-frequency beam sweep or an inter-frequency beam sweep.

8. The method of claim 1, wherein the beam sweep procedure further comprises:
determining, based on the previous beam measurements, an early exit condition to be used for performing the beam sweep procedure; and
exiting the beam sweep procedure when the early exit condition is satisfied before all of the one or more candidate beams are measured.

9. The method of claim 8, wherein the early exit condition comprises a condition in which beam measurements satisfy an absolute threshold and a relative threshold.

10. The method of claim 8, wherein the early exit condition comprises a condition in which beam measurements satisfy a Signal to Noise Ratio (SNR) threshold value and a Reference Signal Received Power (RSRP) threshold value.

11. The method of claim 8, wherein the early exit condition comprises a condition in which a number of qualified beams has been found for adding or handover to the second cell.

12. The method of claim 2, wherein the beam sweep procedure further comprises determining the order of the one or more candidate beams for performing the beam sweep procedure based on orientation and displacement of the UE.

13. The method of claim 2, wherein the beam sweep procedure further comprises determining the order of the one or more candidate beams for performing the beam sweep procedure based on UE trajectory, UE sensor information, and beam direction information.

14. An apparatus for wireless communications comprising:
a processor; and
a memory coupled with the processor, with instructions stored in the memory, the instructions being executable by the processor to cause the apparatus to:
establish a first connection with a first cell operating in accordance with a first radio access technology (RAT);
perform a beam sweep procedure for one or more candidate beams for adding or handover to a second cell operating in accordance with millimeter wave (mmW) RAT, wherein the beam sweep procedure is performed based on previous beam measurements stored in a measurement database and based on a determination of limited movement by a user equipment (UE) associated with the apparatus since performing previous beam measurements;
select a beam from the one or more candidate beams for adding or handover to the second cell based on the beam sweep procedure; and
add or hand over to the second cell by establishing a second connection with the second cell using the selected beam.

15. The apparatus of claim 14, wherein the beam sweep procedure further comprises:
determining, based on the previous beam measurements, an order of the one or more candidate beams for performing the beam sweep procedure; and
performing the beam sweep procedure of the one or more candidate beams based on the order.

16. The apparatus of claim 15, wherein the order is determined based on previous beam measurements that are measured within a particular time period from a current time.

17. The apparatus of claim 16, wherein the beam sweep procedure further comprises:
extending the particular time period to include additional previous beam measurements for determining the order of the one or more candidate beams.

18. The apparatus of claim 15, wherein the order is determined based on the previous beam measurements that are above a particular value of Reference Signal Receiver Power (RSRP).

19. The apparatus of claim 14, wherein the beam sweep procedure further comprises:
determining, based on the previous beam measurements, a Low-Noise Amplifier (LNA) gain state to be used for Automatic Gain Control (AGC) in performing the beam sweep procedure; and
performing the beam sweep procedure using the LNA gain state.

20. The apparatus of claim 19, wherein the beam sweep procedure further comprises determining the LNA gain state based on an intra-frequency beam sweep or an inter-frequency beam sweep.

21. The apparatus of claim 14, wherein the beam sweep procedure further comprises:
determining, based on the previous beam measurements, an early exit condition to be used for performing the beam sweep procedure; and
exiting the beam sweep procedure when the early exit condition is satisfied before all of the one or more candidate beams are measured.

22. The apparatus of claim 21, wherein the early exit condition comprises a condition in which beam measurements satisfy an absolute threshold and a relative threshold.

23. The apparatus of claim 21, wherein the early exit condition comprises a condition in which beam measurements satisfy a Signal to Noise Ratio (SNR) threshold value and a Reference Signal Received Power (RSRP) threshold value.

24. The apparatus of claim 21, wherein the early exit condition comprises a condition in which a number of qualified beams has been found for adding or handover to the second cell.

25. The apparatus of claim 15, wherein the beam sweep procedure further comprises determining the order of the one or more candidate beams for performing the beam sweep procedure based on orientation and displacement of the UE.

26. The apparatus of claim 15, wherein the beam sweep procedure further comprises determining the order of the one or more candidate beams for performing the beam sweep procedure based on UE trajectory, UE sensor information, and beam direction information.

27. An apparatus for wireless communications comprising:
   means for establishing a first connection with a first cell operating in accordance with a first radio access technology (RAT);
   means for performing a beam sweep procedure for one or more candidate beams for adding or handover to a second cell operating in accordance with millimeter wave (mmW) RAT, wherein the beam sweep procedure is performed based on previous beam measurements stored in a measurement database and based on a determination of limited movement by the apparatus since performing previous beam measurements;
   means for selecting a beam from the one or more candidate beams for adding or handover to the second cell based on the beam sweep procedure; and
   means for adding or handing over to the second cell by establishing a second connection with the second cell using the selected beam.

28. The apparatus of claim 27, wherein the beam sweep procedure further comprises:
   determining, based on the previous beam measurements, an order of the one or more candidate beams for performing the beam sweep procedure wherein the order is determined based on previous beam measurements that are measured within a particular time period from a current time; and
   performing the beam sweep procedure of the one or more candidate beams based on the order.

29. A non-transitory computer-readable medium storing code for wireless communications by a user equipment (UE), the code comprising instructions executable by a processor to:
   establish a first connection with a first cell operating in accordance with a first radio access technology (RAT);
   perform a beam sweep procedure for one or more candidate beams for adding or handover to a second cell operating in accordance with millimeter wave (mmW) RAT, wherein the beam sweep procedure is performed based on previous beam measurements stored in a measurement database and based on a determination of limited movement by the UE since performing previous beam measurements;
   select a beam from the one or more candidate beams for adding or handover to the second cell based on the beam sweep procedure; and
   add or hand over to the second cell by establishing a second connection with the second cell using the selected beam.

30. The non-transitory computer-readable medium of claim 29, wherein the beam sweep procedure further comprises:
   determining, based on the previous beam measurements, an order of the one or more candidate beams for performing the beam sweep procedure, wherein the order is determined based on previous beam measurements that are measured within a particular time period from a current time; and
   performing the beam sweep procedure of the one or more candidate beams based on the order.

* * * * *